Dec. 27, 1960 R. F. OLIVER Re. 24,916

CONVEYOR

Original Filed April 10, 1957 3 Sheets-Sheet 1

INVENTOR.
Roy Franklin Oliver.
BY.
Olson, Trexler, Wegner, van Hoek, Pendleton, & Neuman. Attys.

Dec. 27, 1960 R. F. OLIVER Re. 24,916

CONVEYOR

Original Filed April 10, 1957 3 Sheets-Sheet 2

INVENTOR.
Roy Franklin Oliver.
BY.
Olson, Meklenburger, van Dolst,
Pendleton & Newman.
Attys.

CONVEYOR
Original Filed April 10, 1957 3 Sheets-Sheet 3
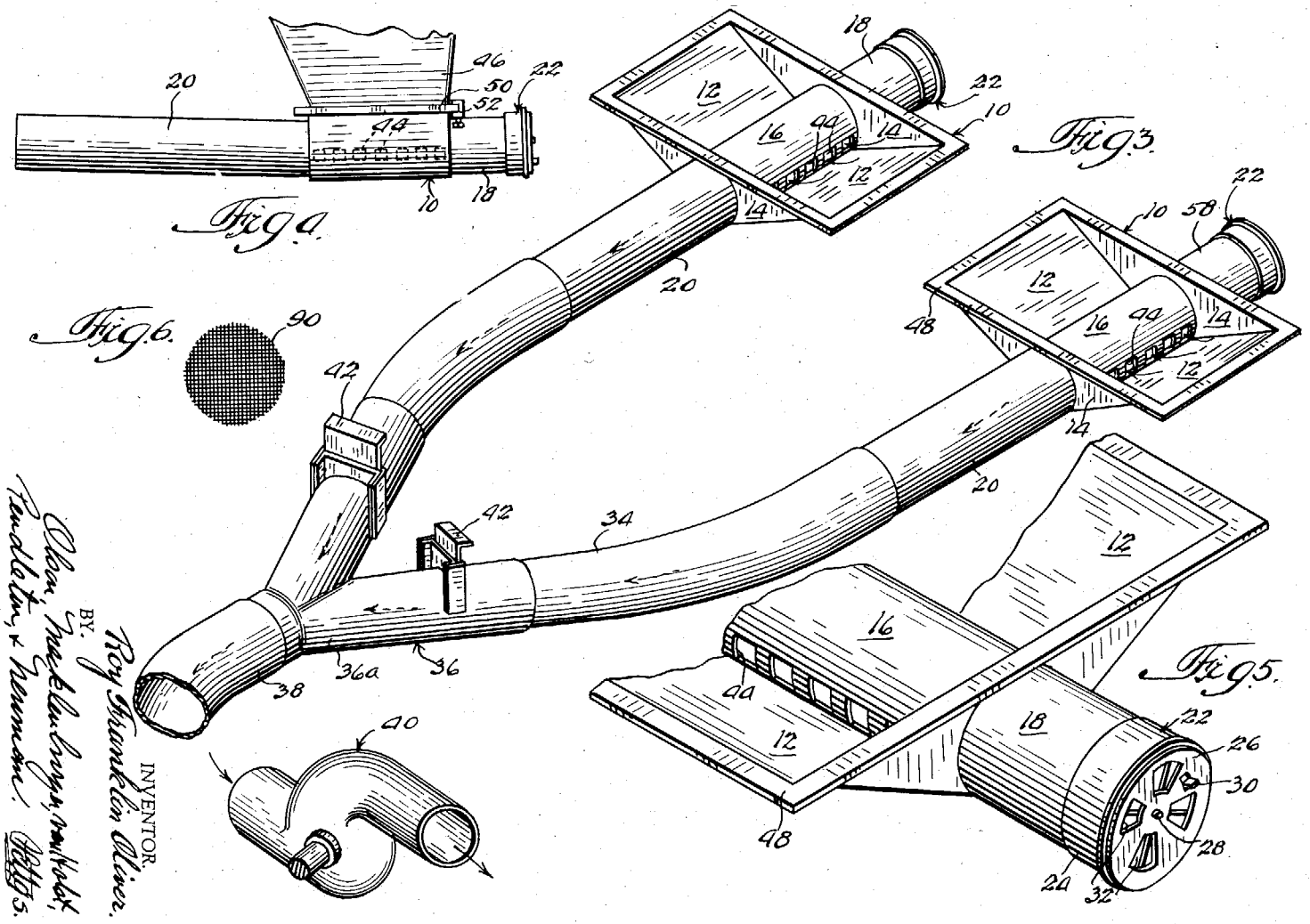
INVENTOR.
Roy Franklin Oliver.
BY.
Olson, Macklenburgh, van Holst,
Pendleton, & Neuman. Attys.

United States Patent Office

Re. 24,916
Reissued Dec. 27, 1960

24,916

CONVEYOR

Roy Franklin Oliver, Crete, Nebr., assignor, by mesne assignments, to Enterprise Railway Equipment Company, Chicago, Ill., a corporation of Illinois Original No. 2,858,165, dated Oct. 28, 1958, Ser. No. 651,999, Apr. 10, 1957. Application for reissue Feb. 29, 1960, Ser. No. 12,894

10 Claims. (Cl. 302—36)

Matter enclosed in heavy brackets [ ] appears in the original patent but forms no part of this reissue specification; matter printed in italics indicates the additions made by reissue.

This invention pertains to apparatus for unloading finely divided materials from hopper bottom cars and similar receptacles, and, more particularly, relates to an attachment which facilitates removal of such finely divided materials by means of suction in an efficient manner heretofore unknown.

The prior art discloses many methods employing a variety of apparatus for removing materials such as ashes, grain, sand, ground charcoal, graphite flour and similar materials from receptacles such as open-top and enclosed railway cars. In some of these latter methods, an open-end tube in communication with a suction-creating device is inserted into the bulk of the material which is to be unloaded, and the latter material is conveyed by suction to collection or storage points. An air inlet disposed in the conduit adjacent the open end is essential for purposes of allowing air to enter the conduit in the course of the pneumatic conveying process.

Such a system has numerous drawbacks. For instance, the worker unloading the receptacle oftentimes inserts the open end of the conduit in the material to such a depth that the air inlet is covered, whereby operation soon stops. Oftentimes, the open end of the conduit is not inserted into the bulk of the material to a sufficient depth whereby inefficiency of the provided system and high operating costs result. Such a system, as just described, is employed with open-top railway cars which allow large quantities of foreign contaminating materials to deposit on the upper surface of the material being unloaded. If a box car having a side opening is employed, particular difficulty is experienced in removing that portion of the finely divided material resting on the box car floor; splinters of wood and other foreign material are often found intermixed with the material being removed.

The unloading and conveying apparatus, which is the subject matter of this invention, comprises a novel hopper attachment, and associated conduit, which is adapted to be secured to the opening in a railway car hopper or to the bottom of any other similar receptacle. Utilizing such a device, it is apparent that the difficulties encountered in employing an open-end conduit member, above described, which is in communication with a suction-creating means is avoided. Since the finely divided materials to be conveyed by the provided apparatus are to be transported in hopper bottom cars, it is apparent that the problems of contamination and difficulty of removal encountered with other types of cars, above mentioned, are also substantially eliminated.

Consequently, it is an object of this invention to provide an improved unloading and conveying apparatus which is simple in details of construction and which may be composed of lightweight, inexpensive materials while affording efficiency of operation heretofore unknown in the art.

It is a further object of this invention to provide apparatus adapted to unload hopper-bottom cars, or similar receptacles, which is very readily cleaned and which insures sanitary operation since contamination by foreign substances is substantially completely avoided.

It is a still further object of this invention to provide an unloading and conveying apparatus which is constructed so as to prevent any possibility of "bridging" of finely divided materials to take place adjacent the outlet apertures and, thus, assures an even continuous unloading operation.

It is another object of this invention to provide apparatus for unloading hopper-bottom railway cars which may simultaneously employ a plurality of hopper attachments whereby a plurality of car hoppers may be emptied concomitantly.

It is also an object of this invention to provide an unloading and conveying apparatus employing a novel adjustable damper member which enables a proper amount of air to be admitted to the apparatus in the normal course of operation.

The above and other objects of this invention will become more apparent upon proceeding with the following detailed description, accompanying drawings and appended claims.

In one embodiment of the unloading and conveying apparatus provided a hopper attachment, having opposed tapering walls and which is itself a hopper member, is employed and has running through the central bottom portion thereof a conduit member. The hopper attachment is adapted to be secured to a hopper spout portion of a railway car, or similar receptacle, from which materials to be unloaded flow. The latter conduit member has opposed rows of apertures through which the finely divided material which is flowing into the hopper attachment enters the conduit and is withdrawn from the interior of the hopper attachment by means of a vacuum created by a vacuum pump, or similar device, which is in communication with the latter conduit.

The apertures in the conduit portion disposed in the hopper attachment member provided by this invention enable the finely divided materials which are to be conveyed away to storage to evenly flow into the conduit without bridging or caking of the materials taking place. The latter conduit portion is preferably of curvilinear or oval cross-sectional configuration. Such configuration will enable the fine materials to flow downwardly in an even manner into the conduit apertures and obviates any possibility of the material gathering on the top surface portion thereof.

In communication with the conduit portion disposed within the hopper are two opposed conduit portions arranged externally of the hopper attachment. One of these two hopper portions is of relatively short length and has disposed over its distal end limit a regulatable damper member which governs the volume of air which may be drawn into the conduit system. Attached to an oppositely disposed portion of the apertured conduit portion within the hopper attachment is a conveyor tube system which is in communication with a suction-creating means and which, in turn, terminates in a storage receptacle or other point of collection.

If desired, two or more of the hopper attachments and their elongate conduit portions may join a main conduit branch into which all portions merge. Utilizing such an arrangement, it is apparent that a plurality of hopper attachments may be employed simultaneously, all of which operate on a single suction source.

Valve members which may be of a sliding-gate type may be disposed in each of the conduit portions which merge with a main conduit portion. The valve members enable only desired branches and hopper attachments to be utilized, as desired, since the various branches may be cut off from the suction source by closing appropriate valve members.

For a more complete understanding of this invention, reference should now be made to the drawings wherein Figure 1 is a fragmentary perspective view of a hopper-bottom railway car member engaging a hopper attachment of this invention, illustrated in normal operating position;

Fig. 3 is a perspective view of two hopper attachments and their merging conduit portions which engage a main conduit member, fragmentarily shown, which is, in turn, in communication with a vacuum-creating means;

Fig. 4 is a fragmentary side elevational view of a hopper attachment provided by this invention, shown attached to the bottom opening of a hopper member;

Fig. 5 is a fragmentary perspective view of a portion of the hopper attachment of this invention together with the damper member associated therewith; and Fig. 6 is a plan view of a filter which may be employed with the illustrated apparatus.

Figure 1:
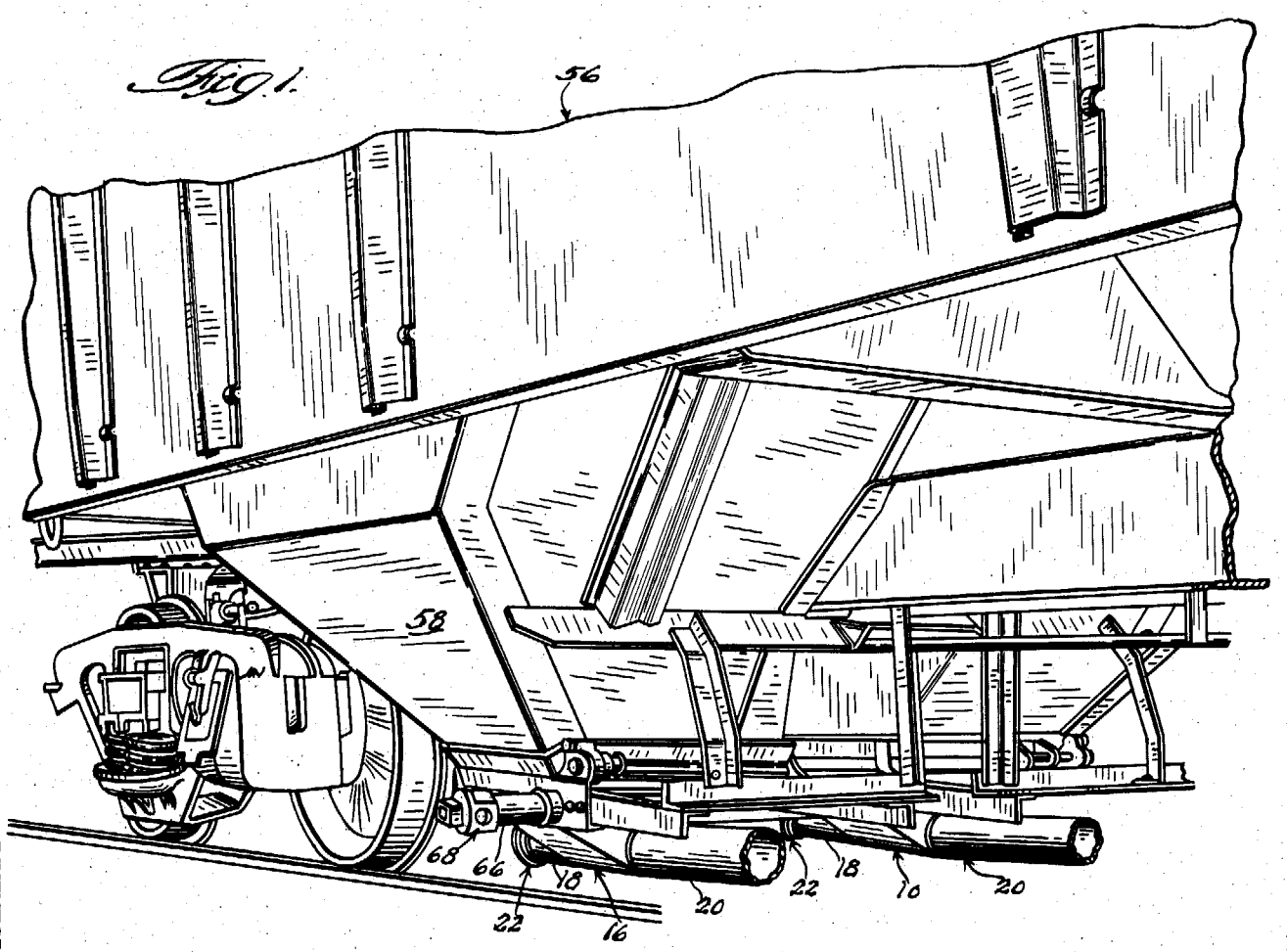

Referring now to the drawings and, more particularly, to Fig. 3, a pair of hopper attachments, which are themselves hopper members, are identified by the numeral 10. The illustrated hoppers or hopper attachments have a pair of opposed converging side walls 12 and a pair of opposed parallel end walls 14. Disposed between the walls 14 is a conduit portion 16 which is illustrated as being of round or tubular configuration, although other configurations effecting desired material flow may be employed.

In the illustrated apparatus the conduit portion 16 is depicted as being formed integrally with two opposed conduit portions 18 and 20 which are disposed externally of the hopper attachment 10. However, it should be noted that an arrangement whereby the conduit portions 18 and 20 are discrete elements lies within the scope of this invention. It is, of course, equally obvious that the conduit portion 16 may comprise either a curved section which utilizes the bottom portions of the opposed hopper walls 12 as a conduit bottom, or else comprise an integral apertured length of tubing.

The relatively short conduit section 18 disposed normal to one end wall of the hopper attachment 10 has a damper unit 22 disposed over the distal end limit thereof. The latter damper comprises a cylindrical portion 24 having one apertured end surface which has pivotally engaged thereto or rotatably mounted thereon a rotatably movable plate member 26. The latter plate member is pivotally mounted at 28 and is actuated by means of the projecting tab 30. The latter tab enables the size of the openings 32 disposed in the cylindrical portion 24 to be varied. The latter damper member is, thus, seen to be capable of regulating the volume of air which may be drawn into the conduit portion 18 through the openings 32 and, thus allows the device to become adaptable to any pneumatic system.

The conduit portion 20 illustrated in Fig. 3 may be inserted in a flexible conduit tubing 34 which, in turn, is in communication with a branch 36a of a Y-shaped conduit portion 36. The latter Y-shaped member may, in turn, be in communication with another flexible conduit tubing 38 which may be in fluid communication with a vacuum-creating means such as a pump member 40. It is apparent from Fig. 3 that two and even more hopper attachments 10 may have their elongate conduit portions 20 engage flexible tube conduit portions which, in turn, engage conduit branch portions similar to the members 36a illustrated. It will be noted from Fig. 3 that Y-shaped member 36 has the vertically moving gate valves 42 disposed therein which may function to cut off fluid communication between a hopper attachment member 10 associated therewith and the suction pump 40.

Referring now more particularly to Fig. 5, it will be noted that a plurality of apertures 44 are disposed on opposed sides (only one side being illustrated) of the conduit portion 16 disposed in the hopper attachment 10. The area of the aperture openings is preferably substantially equal to the area of the cross section of the conduit portion 18, through which air is drawn in the normal course of operation. The latter size relationship insures the admissibility of a required volume of air in the normal course of the illustrated apparatus operation.

It is the purpose of the apertures 44 disposed in the conduit portion 16 to admit the finely divided materials, such as grain or the like, into conduit portion 16 from which they will be drawn by suction to the flexible tubing portion 34 and then into the conduit portion 36a and main conduit 38. The openings 44 are sufficient in number and area to enable the finely divided materials to smoothly flow into the conduit 16 without bridging or caking action taking place in the hopper 10. The curved configuration of the conduit 16 discourages caking on the top surface portions thereof and facilitates even, continuous flow of the material entering the openings 44.

Fig. 4 illustrates the provided hopper attachment and associated conduit portions attached to bottom spout portion of a hopper member 46. The hopper attachment 10 is connected to the hopper opening-defining flange portions 50 formed integrally with hopper 46, through which the materials are to be discharged.

Figure 2:
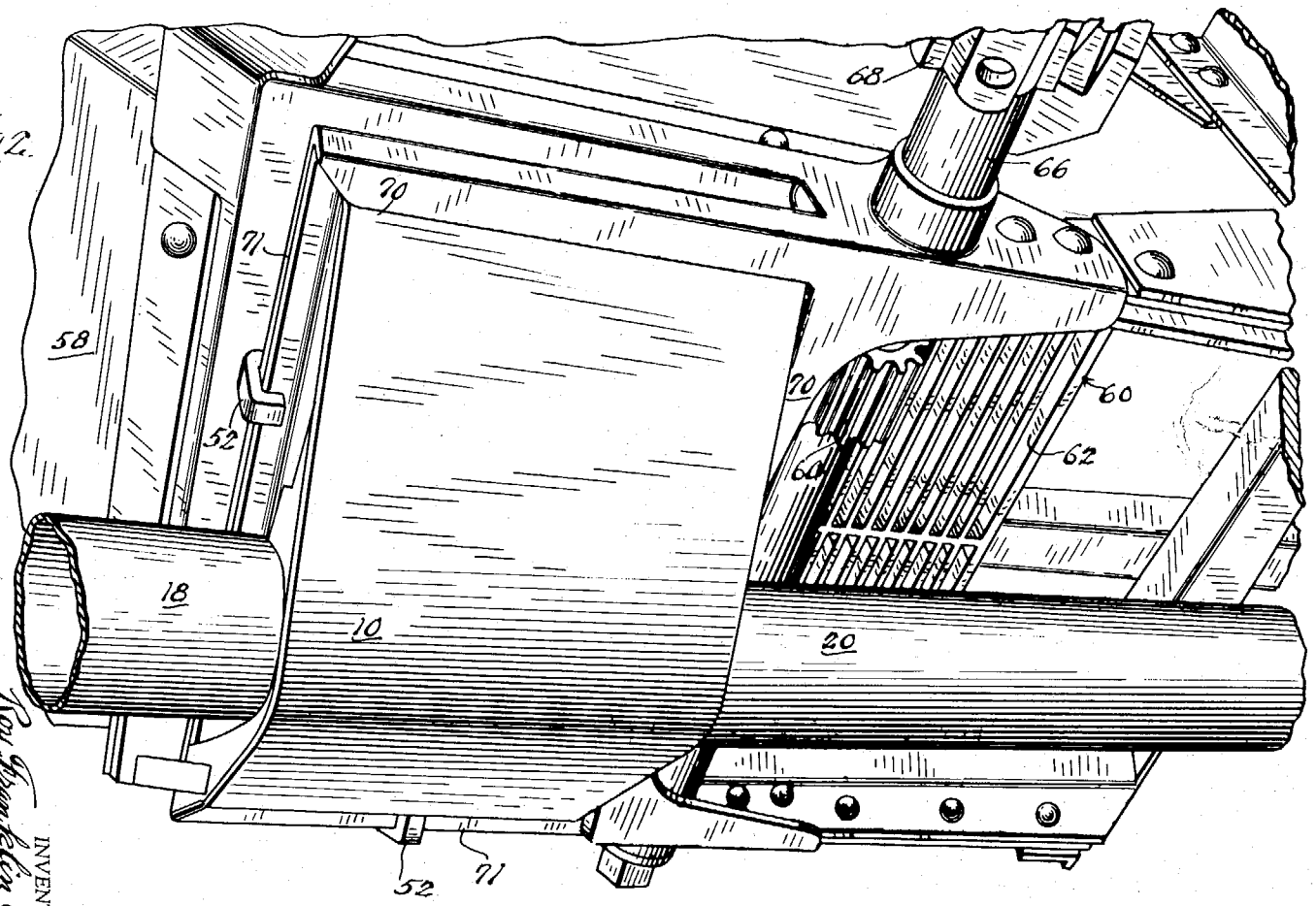
Fig. 2 is a fragmentary bottom perspective view of a portion of the hopper bottom car and hopper attachment illustrated in Fig. 1.

In Fig. 2 the manner in which a hopper attachment 10 is secured to a hopper bottom flanged portion 58 of a hopper car 56 is illustrated. The bottom portion of the hopper 58 defines a spout having an opening which is maintained closed in the normal course of hopper car rail movement by means of a sliding gate member 60. The latter gate is provided on its undersurface with a rack 62 which is adapted to mesh with the teeth of a pinion 64. The latter pinion is mounted on a rotatable shaft 66 having an apertured end portion 68 which is adapted to engage a crowbar or similar crank member which will impart rotational movement to the shaft 66 and associated pinion 64 for purposes of withdrawing the sliding gate 60 from beneath the bottom portion 58 of the hopper car.

It will be noted, more particularly from Fig. 2, that the car hopper is provided with two grooved edge portions 70 which the flange portions 48 of the hopper attachment 10 may engage for support. The C clamps 52 are employed in securing the remaining edges of the hopper attachments 10 to the car hopper ungrooved edge portions 71.

The procedure to be followed in the normal course of operation of the provided apparatus is substantially as follows:

The hopper attachment 10 is secured to the hopper flange portions 70 and 71, as illustrated in Figs. 1 and 2 directly beneath the openings in the car hoppers 58 which are maintained closed by means of sliding gate members 60. The shaft member 66 is then rotated whereby the pinion member 64 moves the sliding gate member 60 from beneath the hopper member 58, enabling the finely divided materials in the car hopper to fall therefrom by gravity into the hopper attachment 10.

The suction-creating means such as the pump 40 illustrated in Fig. 3 is then actuated whereby the material disposed in the hopper adjacent the apertures 44 in the conduit portion 16 will flow into and be drawn through the apertures and conveyed through the conduit portions 20, 34, 36 and 38 to a point of collection. The discharge end of conduit 38, not shown, will be located adjacent suction pump 40.

As soon as the suction is energized the damper plate 26 should be adjusted to allow the most desired volume of air to enter the illustrated system for purposes of enabling the finely divided materials to be conveyed. It is obvious that once the system has been started it will continue to function until the entire contents of the various hoppers are exhausted.

Should one hopper be emptied before another and should the hopper system in Fig. 3 be utilized, a sliding valve 42 may be moved into the closed position, shutting off the vacuum source from the car hopper which has been emptied. One hopper attachment 10 may then be readily disengaged and secured to a new hopper member after which the associated hopper gate 60 thereof will be opened, and slide valve 42 of the conduit associated with the appropriate hopper attachment 10 will be opened, enabling the unloading operation to continue uninterrupted.

It is apparent that many modifications may be made in the illustrated apparatus which will affect operation in some certain respects but which will still remain within the ambit of the inventive concepts disclosed.

For more efficient operation, the conduit portion 20 should be inserted into the flexible-tube conduit portion 34 and the latter tube portion inserted into an opening of the Y-shaped conduit 36 in the manner illustrated. By having the conduit portion disposed further from the suction source inserted into the conduit portion disposed closer to the suction source, it is apparent that the jamming of material into the interfaces defined by the telescoping conduit portions is avoided.

Referring to Fig. 4, it will be noted that the adjustable damper member 22 should be disposed a certain minimum distance from the conduit portion 16 disposed in the hopper attachment 10. This distance should be sufficient to prevent materials falling from an overlying hopper to flow through the openings 44 and escape through the adjustable damper 22. Consequently, by making the conduit portion 18 of a minimum length, material being unloaded will not fall to the ground beneath the car. Thus, undue waste and an unsightly condition is always guarded against.

In this latter regard, it is also desirable to dispose the conduit portion 18 of the illustrated apparatus at an upwardly inclined angle relative to the conduit portion 16, as illustrated most clearly in Fig. 4. Such disposition will help insure against foreign particles being drawn into conduit portion 18. Conduit portion 20 may also be upwardly inclined as illustrated to assure sufficient clearance with the ground in the course of having tubing 34 connected thereto.

Filters such as filter 90 illustrated in Fig. 6 may be interposed between the rotatable plate 26 and apertures 32 of the damper 22 or otherwise suitably arranged to filter the air admitted into apertures 32. It is obvious that, if a maximum amount of air is required for the provided apparatus, the damper 22 may be removed from the end of the conduit portion 18.

The length of the conduit portion 20 is of no critical importance since it will substantially always be used with elongate flexible tubing of desired length. However, the portion 20 should be long enough so as to assure ready engagement with the flexible tubing. Also, although the apertures 44 in the illustrated conduits are of square configuration, slots or annular openings are also intended to lie within the scope of the provided invention.

It is believed apparent that other modifications falling within the scope of this invention may be devised. It is intended, therefore, that this invention be limited only by the scope of the appended claims.

I claim:

1. Apparatus for conveying finely divided material from a plurality of receptacles comprising a plurality of hopper attachments, each of said hopper attachments having opposed converging wall portions, and means forming a conduit portion with said wall portions running therethrough and having a plurality of apertures disposed in said conduit portion adjacent said wall portions, a first conduit portion disposed externally of each of said hopper attachments in communication with said apertured conduit portion, vacuum-creating means in communication with each of said hopper attachments, a second conduit portion disposed externally of each of said hopper attachments in communication with each of said apertured conduit portions and oppositely disposed to said first conduit portion, regulatable damper means disposed in each of said second conduit portions, a main conduit member in communication with each of said first conduit portions' distal end limits, each branch of said conduit members in communication with each of said hopper attachment members having valve means disposed therein whereby each of said hopper attachments may be disconnected from said main conduit member and suction-creating means in communication with said main conduit member.

2. An apparatus for conveying finely divided material comprising receptacle means having converging wall portions, conduit means resting on the bottom of said receptacle means along the axis of said wall portions convergence in the normal position of assembly whereby said conduit means rests on both wall portions, said conduit means having spaced apertures arranged substantially along parallel axes disposed adjacent the areas of engagement between said conduit means and each of said receptacle means converging wall portions, and means cooperating with one end of said conduit means disposed externally of said receptacle means for regulating the admission of air into said conduit means end.

3. The apparatus as recited in claim 2 in which said conduit means is of curvilinear cross-section whereby such finely divided material deposited on the surface thereof readily flows over the periphery thereof to the junctures between said conduit means and receptacle wall portions.

4. An apparatus for conveying finely divided materials comprising a receptacle for snugly engaging the discharge opening of a hopper or the like, said receptacle comprising opposed downwardly converging wall portions joining along a substantially central axis of said receptacle, conduit means engaging said converging wall portions disposed substantially along said receptacle central axis, said conduit means having a plurality of spaced apertures arranged substantially along two axes arranged adjacent said conduit means-receptacle wall engagements, means in fluid communication with said conduit means and with the surrounding atmosphere disposed externally of said receptacle and means for regulating said communication between said conduit means and said surrounding atmosphere in the normal course of operation.

5. An apparatus for conveying finely divided materials comprising a receptacle for snugly engaging the discharge opening of a hopper or the like, said receptacle having converging wall portions and a conduit means arranged along the juncture between said wall portions, said conduit means having a plurality of spaced apertures arranged adjacent the junctures said conduit means effects with each of said converging wall portions, means in fluid communication with said conduit means and having an opening in communication with the surrounding atmosphere disposed externally of said receptacle, means for regulating the size of said opening in said means in communication with the surrounding atmosphere, the maximum area of said opening in communication with the surrounding atmosphere being at least equal to the combined area of said conduit means spaced apertures.

*6. An apparatus for conveying finely divided material comprising receptacle means having wall portions converging along a line forming a convergence axis, conduit means on said receptacle means along said axis, said conduit means having apertures arranged substantially along parallel axes adjacent each of said receptacle means converging wall portions to permit the flow of lading from said receptacle means to said conduit means, means pro-*

*viding for the intake of air into said conduit means, and means providing for the evacuation of air and lading from said conduit means.*

*7. An apparatus for conveying finely divided material comprising receptacle means having converging side wall portions and end wall portions, said side wall portions converging along a line forming a convergence axis, conduit means on said receptacle means along said axis, said conduit means having apertures arranged substantially along parallel axes in the sides of said conduit means and adjacent each of said receptacle means converging side wall portions and placing the space in said receptacle means in communication with the interior of said conduit means to permit lading in the former to flow into the latter, means providing for the intake of air into said conduit means, and means providing for the evacuation of air and lading from said conduit means.*

*8. An apparatus for conveying finely divided material comprising receptacle means having converging side wall portions and end wall portions, said side wall portions converging along a line forming a convergence axis, conduit means on said receptacle means along said axis, said conduit means having apertures arranged substantially along parallel axes in the sides of said conduit means and adjacent each of said receptacle means converging side wall portions and placing the space in said receptacle means in communication with the interior of said conduit means to permit lading in the former to flow into the latter, means providing for the intake of air through one of said end wall portions into said conduit means, and means providing for the evacuation of air and lading through the other of said end wall portions from said conduit means.*

*9. An apparatus for conveying finely divided material comprising receptacle means having converging side wall portions and end wall portions, said side wall portions converging along a line forming a convergence axis, conduit means on said receptacle means along said axis in the form of an inverted generally U-shaped conduit section to provide with the said side wall portions a conduit section having an upper conduit section and a lower conduit section having apertures therebetween arranged substantially along parallel axes whereby lading in said receptacle means flows onto said lower conduit section, means providing for the intake of air into said conduit means, and means providing for the evacuation of air and lading from said conduit means.*

*10. An apparatus for conveying finely divided material comprising receptacle means having converging side wall portions and end wall portions, said side wall portions converging along a line forming a convergence axis, conduit means on said receptacle means along said axis in the form of an inverted generally U-shaped conduit section to provide with the said side wall portions a conduit section having an upper conduit section and a lower conduit section having apertures therebetween arranged substantially along parallel axes whereby lading in said receptacle means flows onto said lower conduit section, means providing for the intake of air through one of said end wall portions into said conduit means, and means providing for the evacuation of air and lading through the other of said end wall portions from said conduit means.*

References Cited in the file of this patent or the original patent

UNITED STATES PATENTS

| | | |
|---|---|---|
| 624,237 | Newell | May 2, 1899 |
| 1,901,791 | Woodeson | Mar. 14, 1933 |
| 2,303,810 | Anderson | Dec. 1, 1942 |

FOREIGN PATENTS

| | | |
|---|---|---|
| 239,505 | Great Britain | Aug. 25, 1925 |